United States Patent
Brunswig et al.

(10) Patent No.: US 8,788,533 B2
(45) Date of Patent: Jul. 22, 2014

(54) READ ACCESS LOGGING

(71) Applicants: Frank Brunswig, Heidelberg (DE); Jan Hrastnik, Sandhausen (DE); Matthias Richter, Sinsheim (DE)

(72) Inventors: Frank Brunswig, Heidelberg (DE); Jan Hrastnik, Sandhausen (DE); Matthias Richter, Sinsheim (DE)

(73) Assignee: SAP AG, Walldorf (DE)

( * ) Notice: Subject to any disclaimer, the term of this patent is extended or adjusted under 35 U.S.C. 154(b) by 14 days.

(21) Appl. No.: 13/661,052

(22) Filed: Oct. 26, 2012

(65) Prior Publication Data
US 2014/0122436 A1  May 1, 2014

(51) Int. Cl.
*G06F 17/30* (2006.01)

(52) U.S. Cl.
USPC ........... 707/788; 707/661; 707/781; 715/234; 726/2; 726/27; 713/182; 709/223

(58) Field of Classification Search
None
See application file for complete search history.

(56) References Cited

U.S. PATENT DOCUMENTS

| | | | |
|---|---|---|---|
| 7,127,456 B1 * | 10/2006 | Brown et al. | 1/1 |
| 7,769,713 B1 * | 8/2010 | Karr et al. | 707/609 |
| 8,271,804 B2 * | 9/2012 | Kudo | 713/193 |
| 8,326,922 B2 * | 12/2012 | Kern et al. | 709/203 |
| 2007/0288768 A1 * | 12/2007 | Nesta et al. | 713/194 |
| 2008/0010497 A1 * | 1/2008 | Kronlund et al. | 714/6 |
| 2008/0016021 A1 * | 1/2008 | Gulbeden et al. | 707/1 |
| 2008/0065588 A1 * | 3/2008 | Aldrich et al. | 707/2 |
| 2008/0250074 A1 * | 10/2008 | Parkinson | 707/200 |
| 2008/0270745 A1 * | 10/2008 | Saha et al. | 712/1 |
| 2009/0089592 A1 * | 4/2009 | Kudo | 713/193 |
| 2012/0005542 A1 * | 1/2012 | Petersen et al. | 714/48 |
| 2012/0109893 A1 * | 5/2012 | Bryson | 707/634 |
| 2012/0192267 A1 * | 7/2012 | Aizawa | 726/17 |
| 2012/0246303 A1 * | 9/2012 | Petersen et al. | 709/224 |

\* cited by examiner

*Primary Examiner* — Hung Le (57) ABSTRACT

Read access logging is performed by tracing data accesses in all domains. The logged data is traced on metadata level with some additions identifying the exposed data records. All data relevant for read access logging is stored at first in a temporary log, which is later processed, structured, and archived.

14 Claims, 7 Drawing Sheets

FIG. 7

READ ACCESS LOGGING

FIELD

The field relates to logging of data. More precisely, the field relates to read access logging.

BACKGROUND

There are requirements for data protection and privacy in many countries. Read Access Logging (RAL) is a mechanism usually required when authorizations are not sufficient to address the need for data protection and privacy, or when highly sensitive information is accessed.

Configuring logging consistently across many applications is costly and time consuming. Therefore, a technology providing a standard solution is desirable. At present, logging is addressed only in specific applications. The more applications support logging with local solutions, the worse total cost of ownership would be.

Logs are personal information on their own (in case personal information is viewed, this can be data of two or even more persons), and require purpose, authorizations, deletion, etc. like any other data. Some regulations even require encryption.

Logging shall be done where data is disclosed to a user or a third party. This implies that the data that is replicated between different systems of the same controller does not need to be logged. Even a report that is run and produces some output does not need to be logged, but when that output is then printed or viewed, logging shall take place. This may cause necessity for producing metadata when running the report for later use during printing or viewing, at least when highly sensitive information is processed. A challenge can be replication to systems or frontends that do not have adequate logging mechanisms in place or where these mechanisms can be easily bypassed. In that case logging likely has to take place at the time the replication takes place.

Capturing data about access is not sufficient, there must be tools to evaluate logs and to delete or archive logs. Logging shall be possible for all user interfaces (UIs), all downloads, and all interfaces or at least those that can be used for external communication. Some regulations require attempts for access to be logged as well.

SUMMARY

Various embodiments of systems and methods for read access logging are described herein. In one embodiment, the method includes enabling the read access logging for at least one user and at least one data set and receiving an access request from the at least one user via a domain. The method also includes determining a requirement for read access logging for the domain and the at least one user and saving log data for exposed data from the at least one data set to the at least one user in a fast read log file. The method further includes processing the fast read log file into a structured read access log file and auditing the structured read access log file.

In other embodiments, the system includes a processor and memory in communication with the processor. The system also includes an enabling module within the memory to enable the read access logging for at least one user and at least one data set and a receiving module within the memory to receive an access request from the at least one user via a domain. The system further includes a determining module within the memory to determine a requirement for read access logging for the domain and the at least one user and a saving module within the memory to save the log data for exposed data from the at least one data set to the at least one user in a fast read log file. The system also includes a processing module within the memory to process the fast read log file into a structured read access log file and an auditing module within the memory to allow auditing the structured read access log file.

These and other benefits and features of embodiments will be apparent upon consideration of the following detailed description of preferred embodiments thereof, presented in connection with the following drawings.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for read access logging are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

A read log becomes necessary when users need to be authorized for accessing sensitive information. Requirements imposed by data protection laws enforce that a read log has to provide information about which data is exposed to an interface accessible for users of a system as well as which data is sent out of the system to a third party (for example within web service based communication scenarios). In both cases it is not sufficient to simply track data accesses on database level. Tracking data accesses on database level would result in logging data which is merely used for system internal processing. Instead, only the data which is actually exposed and might be read by a user shall be traced.

Figure 1:
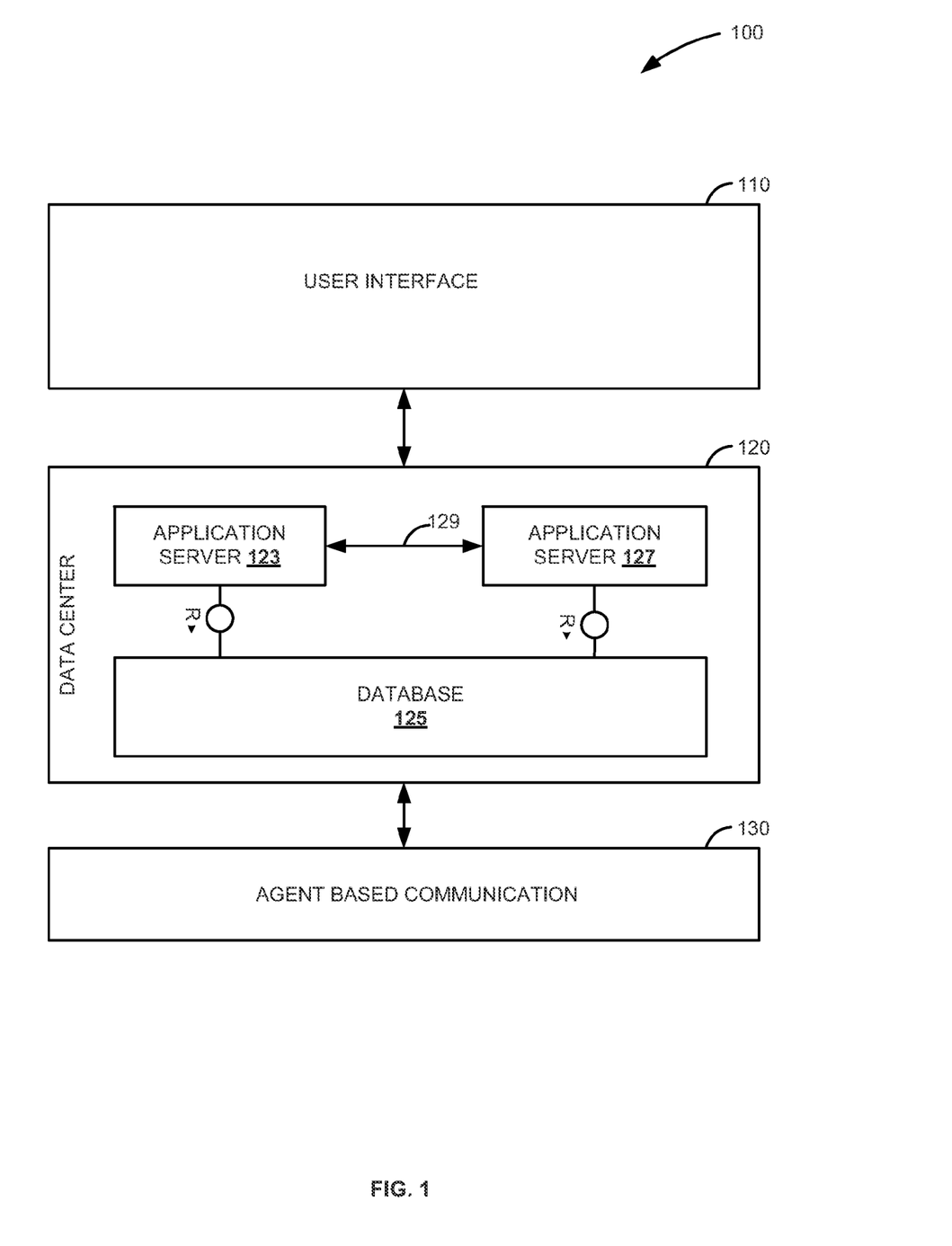
FIG. 1 is a block diagram illustrating an exemplary system architecture that may utilize a logging mechanism.

FIG. 1 is a block diagram illustrating an exemplary system architecture that utilizes a logging mechanism. The system 100 includes a Data center 120, User interface 110 to access the data center, and an Agent based communication 130 providing communication of the Data center 120 with external systems. The Data center 120 includes a Database 125 and Application servers 123 and 127 operating on the database 125. The content of the database 125 is not relevant for the log. Log relevant data is all data going out of the data center 125. Business object (BO) instances, including fields presented on User interface 110 shall be logged. Logging of BO data may be avoided if BO change log is available. Only information transported to the User interface 110 is logged. Even fields, which are invisible, are logged if they are transported to the User interface 110. The user interface 110 may be a browser, form, etc. Personalized fields, which are transported, are logged, while removed fields by personalization are not logged.

In addition, all data transferred to external destinations through the Agent based communication 130 is logged. Such kind of communication includes all third party communication, no matter the exact form of communication. Application-to-application (A2A) messages are not logged if they are within the same data center as, for example, Messages 129 between the Application server 123 and Application server 127 within the Data center 120. Logging is configurable on BO and attributes level. Deletion of the read logs is also configurable.

An auditing user interface for analyzing the log data may be provided. An auditing user interface may be based on the original user interfaces 110 or may be different.

Figure 2:
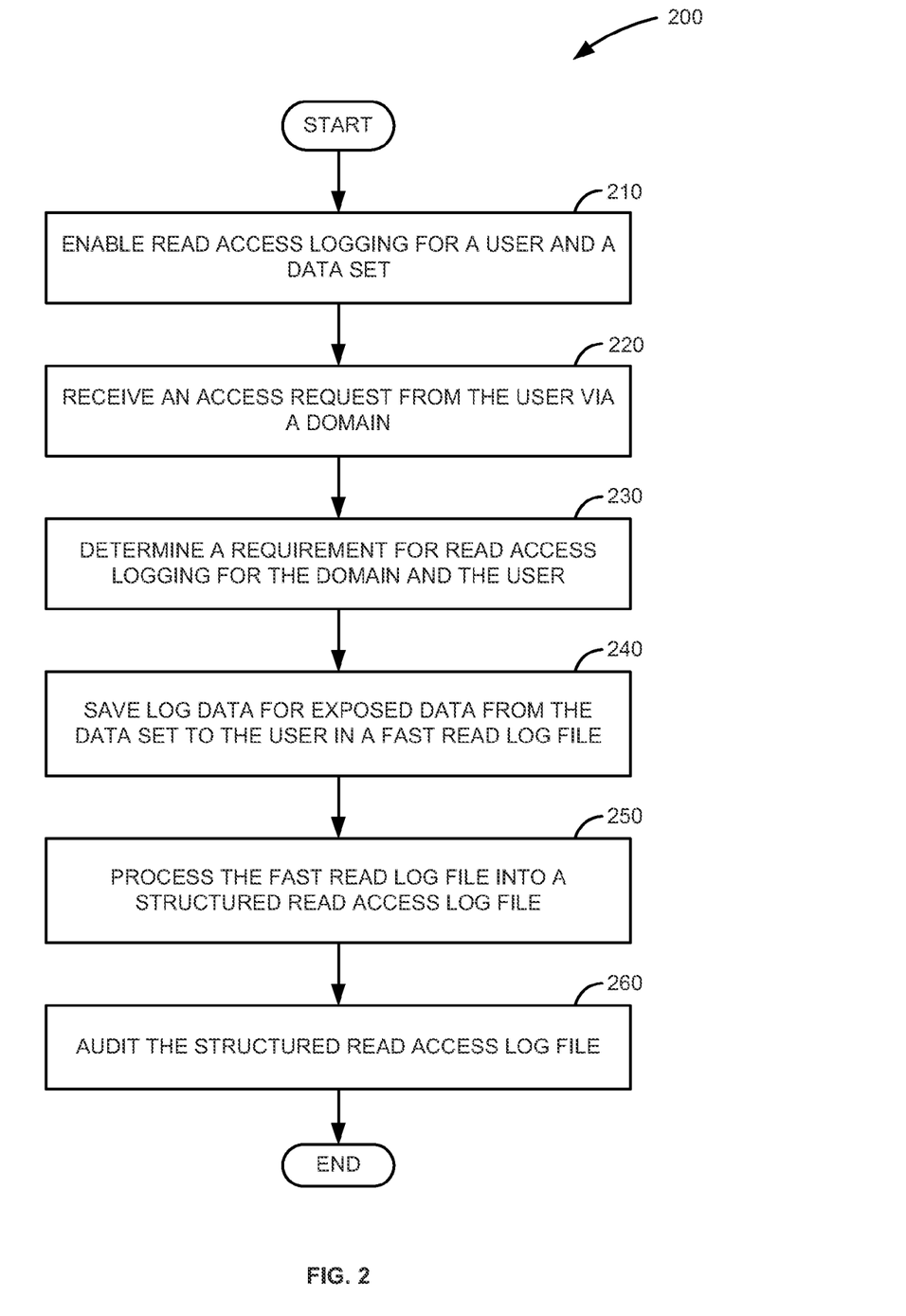
FIG. 2 is a flow diagram of an embodiment of a method for read access logging.

FIG. 2 is a flow diagram of an embodiment of a method 200 for read access logging. The method begins at block 210 with enabling the read access logging for a user and a data set. Read access logging may be enabled for certain users and data sets depending on requirements and regulations for logging data. Typically, read access logging is enabled when specific authorization is required and the accessed data is sensitive in some manner. Thus, not all data is relevant for read access logging, and sensitive data to be logged is marked as read access log relevant.

Then, at block 220, an access request is received from the user via a domain. The domain may be a standard user interface, an inbound or outbound agent for communication, some application specific user interface, etc. In one embodiment, the domain is an application user interface. In some embodiments, Business Objects (BOs) represent the semantic reuse entity for all different kind of domains. All data relevant for read access logging is stored in the persistency of these BOs. According to a programming model and related guidelines, this data is only accessible for and accessed by BO external consumers via well-defined interfaces of these BOs. This is applicable for domains that access BO data and present this data out of a data center to consumers like analytical reports, office integration, application user interfaces and output management. In this case, the read access logging is based on the BOs as a primary source entity and an attribute as well as BO node instance mapping information in the different domains. In some embodiments the mapping information is persisted in where-used lists.

Figure 3:
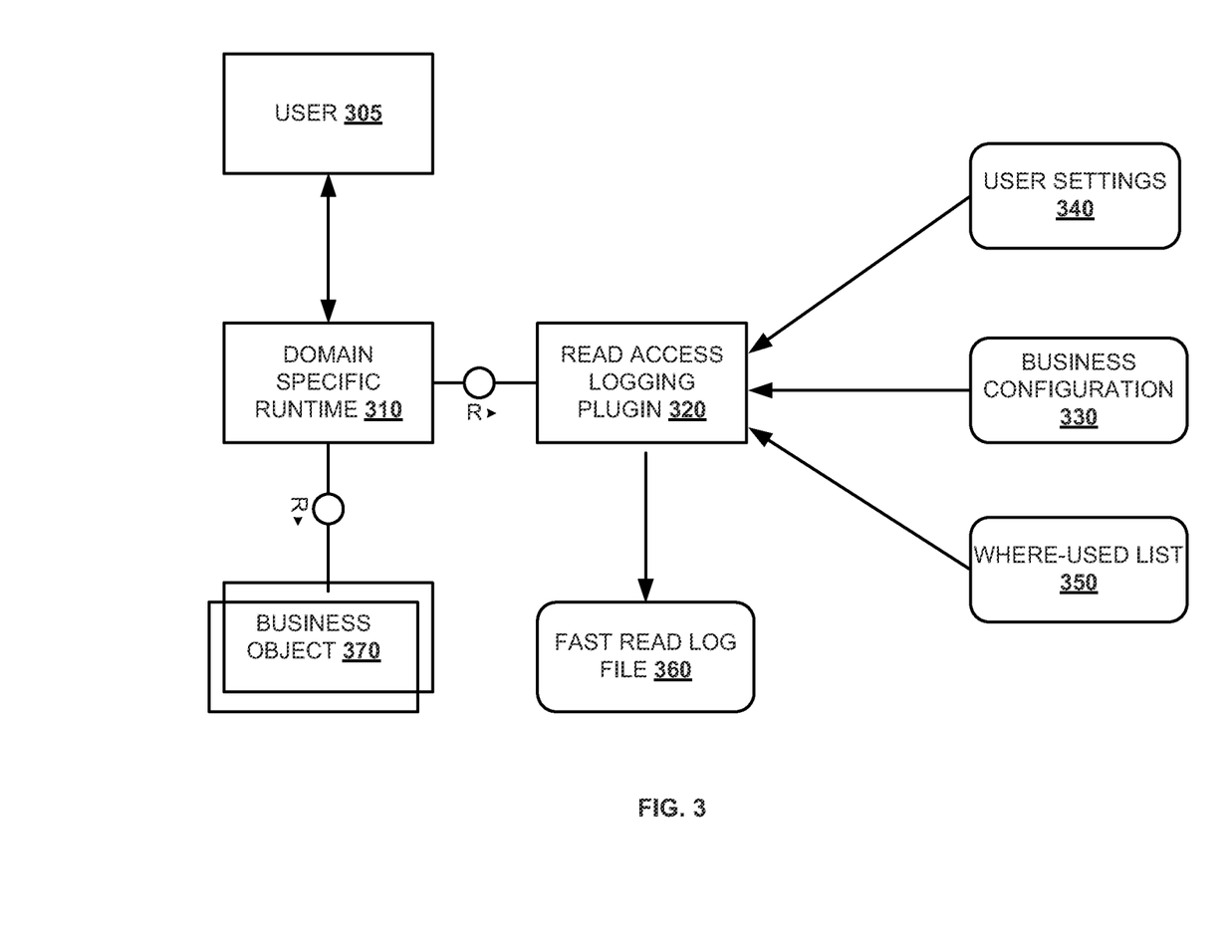
FIG. 3 is a block diagram illustrating a preliminary phase according to an embodiment of a system for read access logging.

Then at block 230, a requirement for read access logging is determined for the domain and the user. In one embodiment, the determination is based on business configuration, user settings, and tenant-specific where-used list of relevant business object node attributes. In one embodiment, as presented in FIG. 3, a Domain specific runtime 310 calls a Read access logging plugin 320 to check if read access logging is required for the given domain model and user 305. The Read access logging plugin 320 evaluates this information based on its Business configuration 330, User settings 340, and a tenant-specific Where-used list 350 of relevant BO node attributes, the list optimized for runtime evaluations.

Turning back to FIG. 2, then, at block 240, log data is saved in a fast read log file for exposed data to the user from the data set. The log data is dumped in the fast read log file without any preprocessing except for some data compression, thus ensuring low processing time. Referring again to FIG. 3, in one embodiment, the Domain specific runtime 310 calls the Read access logging plugin 320 for each response exposing BO data from the BO 370 to a consumer, such as the user 305. The domain passes the name of the domain model, along with a list of accessed BO node attributes and corresponding identifications of instances. To avoid issues related to data privacy and in order to reduce data load on storage level the log may be based on metadata information (for example the user interface application and relevant fields) along with the identification of the accessed core BO node instances. Concrete attribute values of the accessed BO node instances shall not be persisted in the log. Saving log data in a fast read log file, such as Fast read log file 360 ensures low processing time. There is no preprocessing provided for the fast read log file 360 to avoid low performance issues for the domain.

Figure 4:
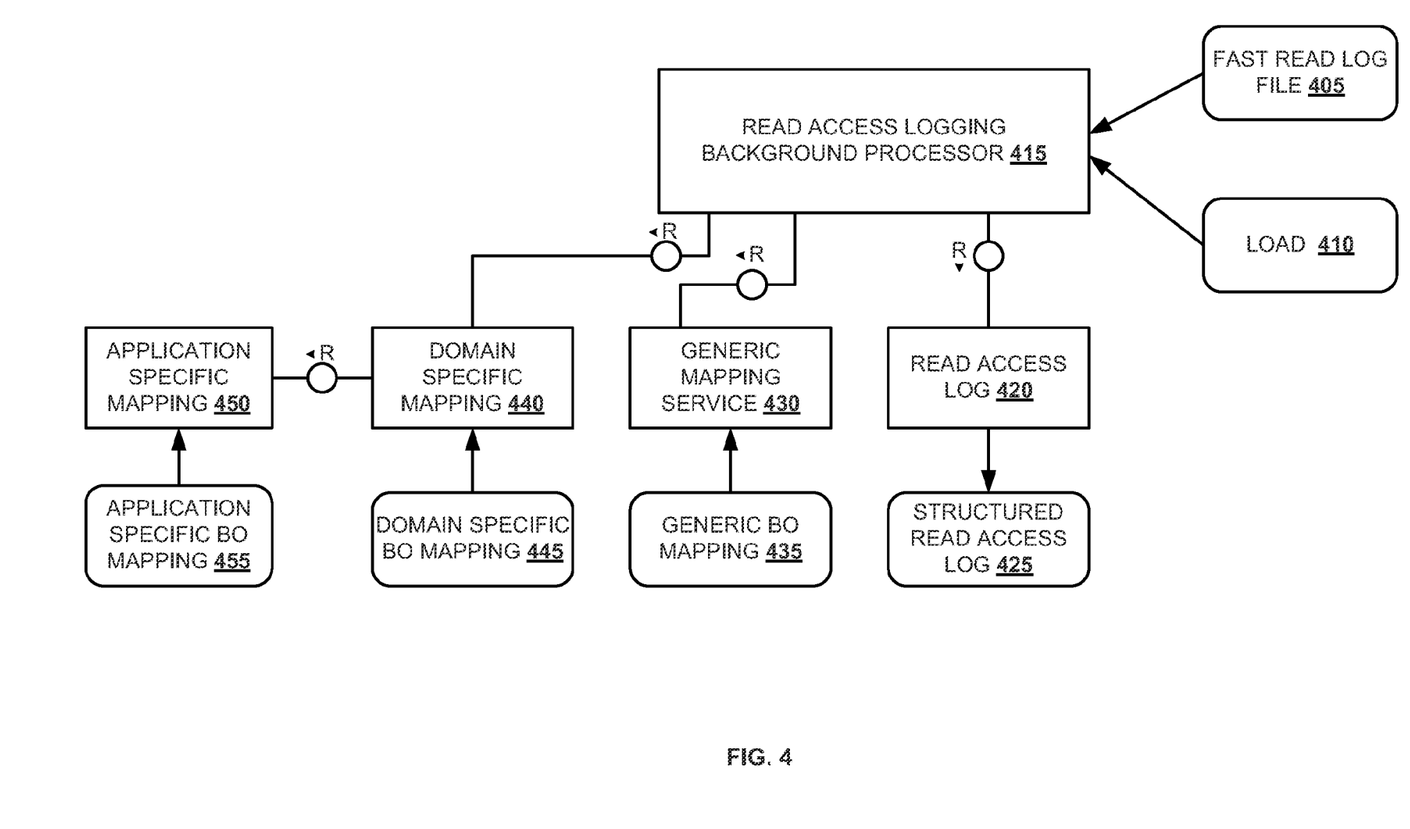
FIG. 4 is a block diagram illustrating an aggregating phase according to an embodiment of a system for read access logging.

Turning again to FIG. 2, at block 250, the fast read log file is processed into a structured read access log file. The structured read access log file aggregates the information from the fast read log file and stores the data for further processing activities. In one embodiment, the processing step includes aggregation of redundant data and deletion of unrequired data for logging. In some embodiments, the processing step also includes deleting the fast read log file after a structured read access log file is created. In one embodiment, as presented in FIG. 4, a Read access logging background processor 415 is looking for unprocessed read log files, such as Fast read log file 405. The Read access logging background processor 415 works asynchronous in the background, thus not affecting any user processing time. Load 410 includes configuration data and other specific data for read access logging. The Read access logging background processor 415 analyses data from the Load 410 and mappings and aggregates information from unprocessed read log files such as Fast read log file 405 to a Structured read access log 425 via a BO Read access log 420. Mappings provide information such as which field in a user interface corresponds to a specific BO field. Mappings are provided to the Read access logging background processor 415 through mapping services, such as Generic mapping service 430, Domain specific mapping 440 and Application specific mapping 450. The mappings are persisted in BOs such as Generic BO mapping 435, Domain specific BO mapping 445, and Application specific BO mapping 455. In one embodiment, if a mapping is not existent, which means not provided by the corresponding domain and any available mapping services, than this napping may be additionally provided by means of an Extensible Markup Language (XML) file, a table or another standard solution for persisting mappings. Aggregation of the data gathered in unprocessed read log files such as Fast read log file 405 is needed, because the log is expected to contain the same accessed data only once and only for those BO node attributes which are actually relevant for read access logging. After being processed the Fast read log file 405 may be deleted.

Turning back to FIG. 2, at block 260, the structured read access log file is audited. Auditing includes activities such as filtering, searching, grouping, analyzing, etc. In one embodiment, auditing includes searching within the structured read access log file. In one embodiment, a set of generic auditing user interfaces are supplied, providing searching capabilities on the logged data. In some embodiments, some capabilities for reconstructing the original attribute values of the business object node instances are provided. For update and delete enabled business objects for which a history of changes is not available, a change log BO shall be used to enable a reconstruction of the data for a given point in time. If there is no change log available at all, the read access logging may provide at least the information which fields were accessed. If the BO node instance exists and there is no data change in between the point in time when the log is written and the point in time at which the auditor requests to see the logged information, the data content may be reconstructed by fetching the current BO data.

Figure 5:
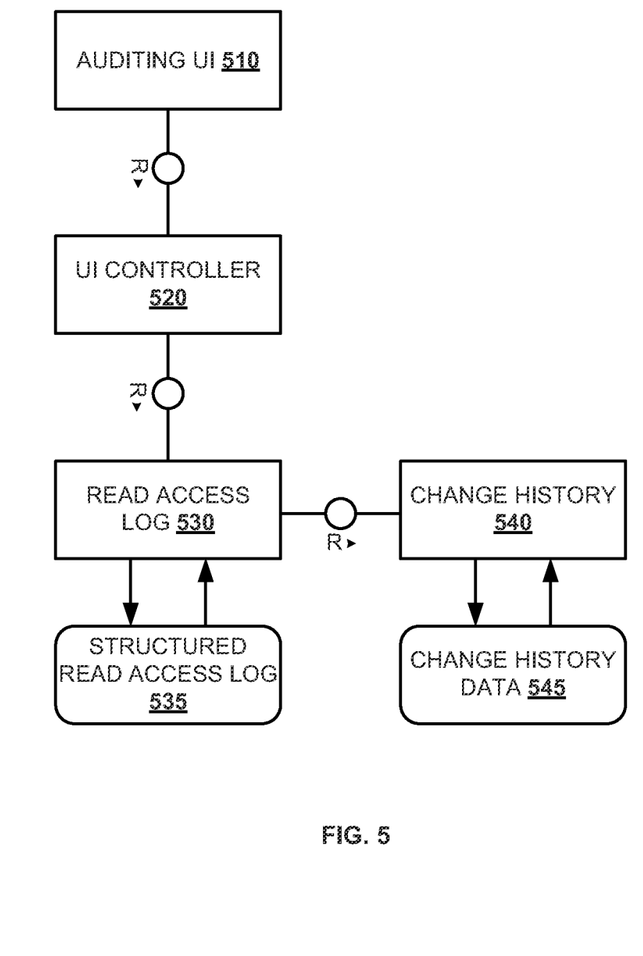
FIG. 5 is a block diagram illustrating an auditing phase according to an embodiment of a system for read access logging.

FIG. 5 is a block diagram illustrating an auditing phase according to an embodiment of a system for read access logging. An auditing UI 510 provides searching capabilities on logged data. Requests received by the auditing UI 510 are transmitted to BO Read access log 530 through a UI controller 520. The logged data is persisted in a Structured read access log file 535. The logged data includes information about the fields that were accessed during logging, time stamps of when the user access one or more of the data fields and information identifying the user. The information about the fields accessed by a user may identify the fields accessed by the user. In some embodiments, the logged data does not include the exact values for the data fields accessed by the user. In some embodiments a change log BO is available such as BO Change history 540 that could be used together with the BO Read access log 530 to reconstruct data in a field for a given point in time. The exact data is persisted in Change history data 545 that may be accessed by the BO Change history 540.

In some embodiments, an application developer may need to classify business objects, business object nodes and business object node attributes as read log relevant. Not all nodes and attributes of a node may be of interest or may technically be enabled. A developer may additionally structure the BO nodes into different "Info Groups". If the data is structured into info groups a customer has to select for which info group the Read Access Logging shall be activated. This additional structure level is needed to keep the number of tracing steps and read log records and with that also the system load as small as possible. On node attribute level the developer can also decide to exclude some of them from read access logging.

Figure 6:
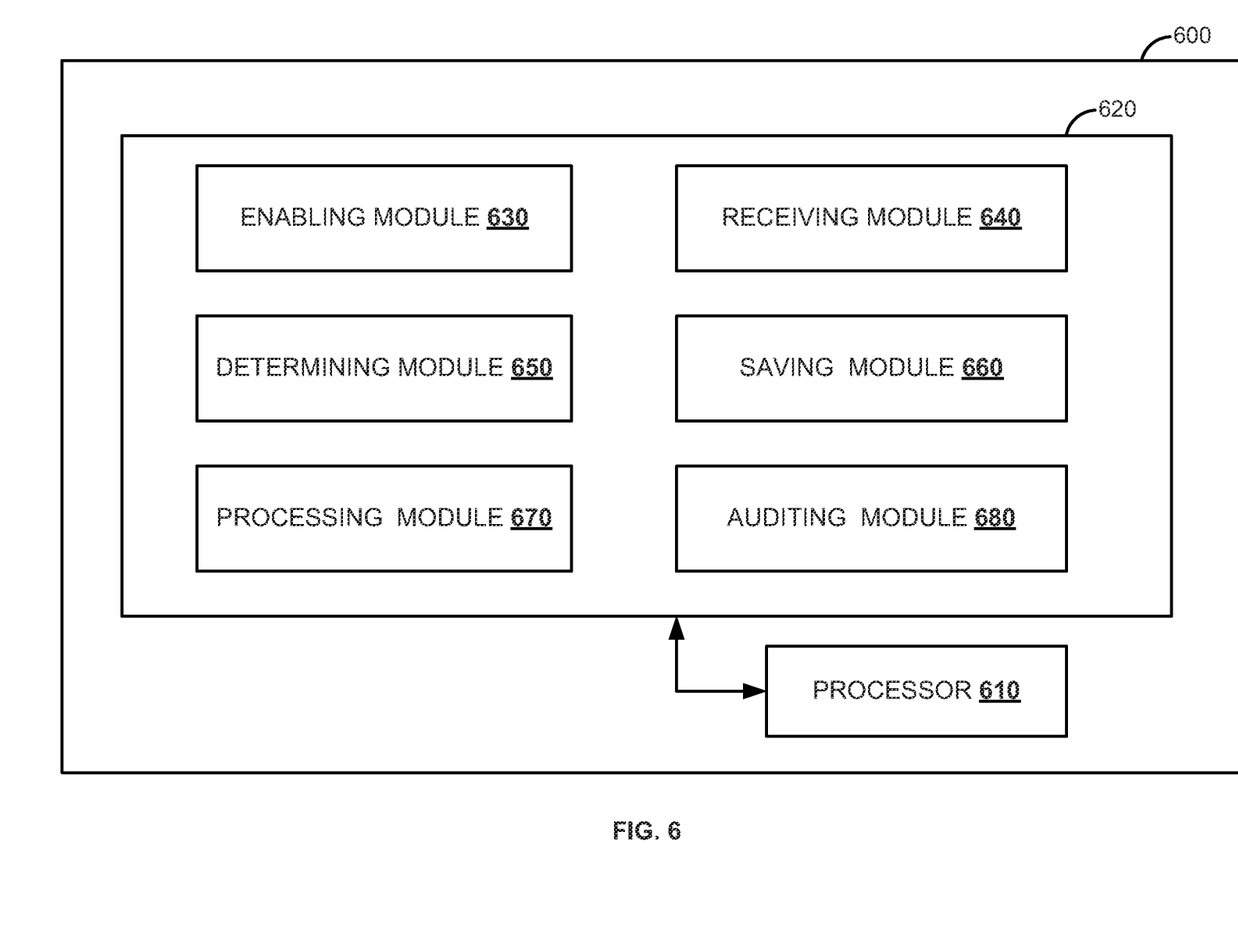
FIG. 6 is a block diagram of an embodiment of a system for read access logging.

FIG. 6 is a block diagram of an embodiment of a system 600 for read access logging. The system 600 includes a processor 610 and memory 620 in communication with the processor 610. The system 600 also includes an enabling module 630, within the memory 620, to enable read access logging for at least one user and at least one data set. Read access logging may be enabled for certain users and data sets depending on requirements and regulations for logging data. Typically, read access logging is enabled when specific authorization is required and the accessed data is sensitive in some manner. Thus, not all data is relevant for read access logging, and sensitive data to be logged is marked as read access log relevant.

The system 600 further includes a receiving module 640, within the memory 620, to receive an access request from the at least one user via a domain. The domain may be a standard user interface, an inbound or outbound agent for communication, some application specific user interface, etc. In one embodiment, the domain is an application user interface. In some embodiments, Business Objects (BOs) represent the semantic reuse entity for all different kind of domains. All data relevant for read access logging is stored in the persistency of these BOs. According to a programming model and related guidelines, this data is only accessible for and accessed by BO external consumers via well-defined interfaces of these BOs. This is applicable for domains that access BO data and present this data out of a data center to consumers like analytical reports, office integration, application user interfaces and output management. In this case, the read access logging is based on the BOs as a primary source entity and an attribute as well as BO node instance mapping information in the different domains. In some embodiments the mapping information is persisted in where-used lists.

The system 600 also includes a determining module 650, within the memory 620, to determine a requirement for read access logging for the domain and the at least one user. In one embodiment, the determining module 650 is also intended to determine the requirement for read access logging for the domain and the at least one user based on business configuration, user settings, and tenant-specific where-used list of relevant business object node attributes.

A saving module 660, within the memory 620, is intended to save log data for exposed data from the at least one data set to the at least one user in a fast read log file. In one embodiment, the saving module 660 is operable to save a domain model, a list of accessed business object node attributes and corresponding identifications of instances.

The system 600 further includes a processing module 670, within the memory 620, to process the fast read log file into a structured read access log file. In one embodiment, the processing module 670 is operable to aggregate redundant data and delete unrequired data for logging. In another embodiment, the processing module 670 is further operable to delete the fast read log file.

An auditing module 680, within the memory 620, is intended to audit the structured read access log file. In one embodiment, the auditing module 680 is operable to search within the structured read access log file.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e. g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java®, C++, or other object-oriented programming language and development tools. Another embodiment may be implemented in hard-wired circuitry in place of, or in combination with machine readable software instructions.

Figure 7:
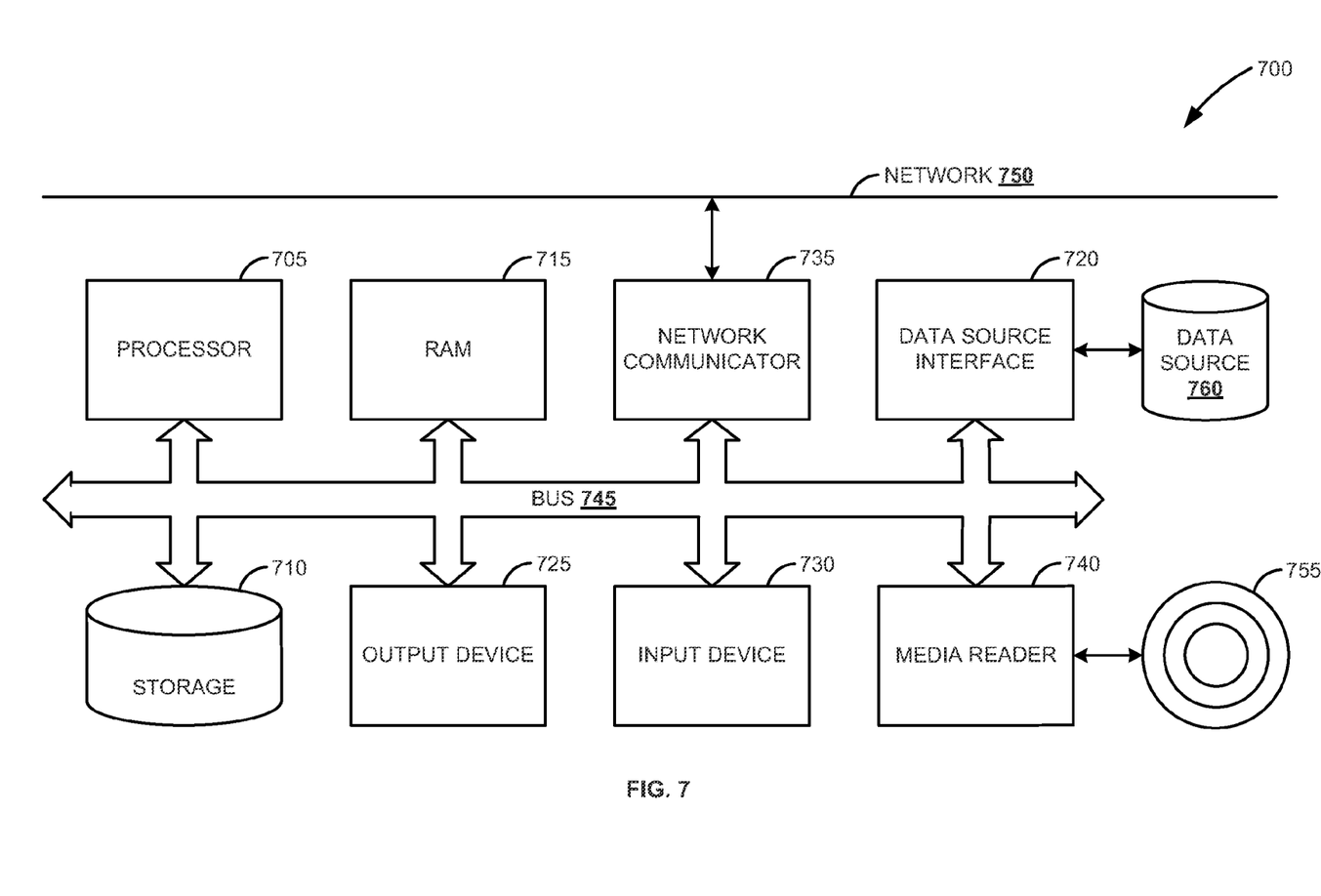
FIG. 7 is a block diagram illustrating a computing environment in which the techniques described for read access logging can be implemented, according to an embodiment.

FIG. 7 is a block diagram of an exemplary computer system 700. The computer system 700 includes a processor 705 that executes software instructions or code stored on a computer readable storage medium 755 to perform the above-illustrated methods. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment, the computer system 700 further includes an output device 725 (e. g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e. g., OLAP), object oriented databases, and the like. Further data sources include tabular data (e. g., spreadsheets, delimited text files), data tagged with a markup language (e. g., XML data), transactional data, unstructured data (e. g., text files, screen scrapings), hierarchical data (e. g., data in a file system, XML data), files, a plurality of reports, and any other data source accessible through an established protocol, such as, Open Data-Base Connectivity (ODBC), produced by an underlying software system (e. g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of and examples for, the present disclosure are described herein for illustrative purposes, various equivalent modifications are possible within the scope of the present disclosure, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method for read access logging comprising:
   enabling the read access logging for at least one user and at least one data set;
   receiving an access request from the at least one user via a domain;
   determining a requirement for read access logging for the domain and the at least one user, wherein the requirement is based on business configuration, user settings, and tenant-specific where-used list of relevant business object node attributes;
   saving log data for exposed data from the at least one data set to the at least one user in a fast read log file, wherein the saved log data in the fast read log file comprises a domain model, a list of accessed business object node attributes and corresponding identifications of business object node instances;
   processing the fast read log file into a structured read access log file; and
   auditing the structured read access log file.

2. The method of claim 1, wherein the domain is an application user interface.

3. The method of claim 1, wherein processing the fast read log file into a structured read access log file comprises aggregation of redundant data and deletion of unrequired data for logging.

4. The method of claim 1, wherein processing the fast read log file into a structured read access log file further comprises deleting the fast read log file.

5. The method of claim 1, wherein auditing the structured read access log file comprises searching within the structured read access log file.

6. A computer system for read access logging comprising:
   a processor; and
   a memory in communication with the processor, the memory storing instructions related to:
      an enabling module to enable the read access logging for at least one user and at least one data set;
      a receiving module to receive an access request from the at least one user via a domain;
      a determining module to determine a requirement for read access logging for the domain and the at least one user, wherein the requirement is based on business configuration, user settings, and tenant-specific where-used list of relevant business object node attributes;
      a saving module to save log data for exposed data from the at least one data set to the at least one user in a fast read log file, wherein the saved log data in the fast read log file comprises a domain model, a list of accessed business object node attributes and corresponding identifications of business object node instances;
      a processing module to process the fast read log file into a structured read access log file; and
      an auditing module to audit the structured read access log file.

7. The system of claim 6, wherein the processing module is operable to aggregate redundant data and delete unrequired data for logging.

8. The system of claim 6, wherein the processing module is further operable to delete the fast read log file.

9. The system of claim 6, wherein the auditing module is operable to search within the structured read access log file.

10. An article of manufacture including a non-transitory computer readable storage medium to tangibly store instructions, which when executed by a computer, cause the computer to:
    enable read access logging for at least one user and at least one data set;
    receive an access request from the at least one user via a domain;
    determine a requirement for read access logging for the domain and the at least one user, wherein the requirement is based on business configuration, user settings, and tenant-specific where-used list of relevant business object node attributes;
    save log data for exposed data from the at least one data set to the at least one user in a fast read log file, wherein the saved log data in the fast read log file comprises a domain model, a list of accessed business object node attributes and corresponding identifications of business object node instances;
    process the fast read log file into a structured read access log file; and
    audit the structured read access log file.

11. The article of manufacture of claim 10, wherein the domain is an application user interface.

12. The article of manufacture of claim 10, wherein the instructions to process the fast read log file into a structured read access log file further comprise instructions, which when executed by a computer, cause the computer to aggregate redundant data and delete unrequired data for logging.

13. The article of manufacture of claim 10 wherein the instructions to process the fast read log file into a structured read access log file further comprise instructions, which when executed by a computer, cause the computer to delete the fast read log file.

14. The article of manufacture of claim 10, wherein the instructions to audit the structured read access log data further comprise instructions, which when executed by a computer, cause the computer to search within the structured read access log file.

* * * * *